(12) United States Patent
Sundararaj et al.

(10) Patent No.: US 12,093,698 B2
(45) Date of Patent: Sep. 17, 2024

(54) DYNAMIC PRE-BOOT CONFIGURATION FOR FLIGHT SYSTEMS

(71) Applicant: ARINC Incorporated, Annapolis, MD (US)

(72) Inventors: Laveen Vikram Sundararaj, Telangana (IN); Nandagopalan Venugopalan, Salem (IN)

(73) Assignee: ARINC Incorporated, Annapolis, MD (US)

( * ) Notice: Subject to any disclaimer, the term of this patent is extended or adjusted under 35 U.S.C. 154(b) by 35 days.

(21) Appl. No.: 18/130,217

(22) Filed: Apr. 3, 2023

(65) Prior Publication Data
US 2024/0248725 A1    Jul. 25, 2024

(30) Foreign Application Priority Data

Jan. 23, 2023   (IN) .............................. 202311004396

(51) Int. Cl.
| | |
|---|---|
| *G06F 9/44* | (2018.01) |
| *G05D 1/00* | (2006.01) |
| *G06F 9/4401* | (2018.01) |
| *G08G 5/00* | (2006.01) |

(52) U.S. Cl.
CPC ........... *G06F 9/4406* (2013.01); *G05D 1/042* (2013.01); *G08G 5/003* (2013.01)

(58) Field of Classification Search
CPC ................. G06F 1/32; G06F 1/12; G06F 9/44
See application file for complete search history.

(56) References Cited

U.S. PATENT DOCUMENTS

| | | | |
|---|---|---|---|
| 9,501,666 B2 | 11/2016 | Lockett et al. | |
| 9,594,567 B2 | 3/2017 | O'Rourke et al. | |
| 9,922,210 B2 | 3/2018 | Oberg et al. | |
| 10,855,674 B1 | 12/2020 | Geusz et al. | |
| 10,977,371 B2 | 4/2021 | Shah et al. | |
| 11,157,288 B2 | 10/2021 | El-Haj-mahmoud et al. | |
| 11,345,473 B1 | 5/2022 | Liberko et al. | |
| 2017/0057634 A1* | 3/2017 | Hunt ...................... | G05D 1/106 |
| 2018/0118338 A1 | 5/2018 | Hunt et al. | |

(Continued)

FOREIGN PATENT DOCUMENTS

| | | |
|---|---|---|
| IN | 201941001283 A | 1/2019 |
| IN | 202241004396 A | 2/2022 |

OTHER PUBLICATIONS

DCPA RPAS Guidance Manual, Government of India, Office of the Director General of Civil Aviation Opp. Safdurjung Airport, New Delhi, Revision 3—2020.

(Continued)

*Primary Examiner* — Keshab R Pandey
(74) *Attorney, Agent, or Firm* — Suiter Swantz IP

(57) ABSTRACT

An unmanned aerial vehicle (UAV) is described. The UAV includes functions such as geo-location-based approvals, targeted system updates and dynamic rule enforcements, authentical, internet protocol (IP) whitelisting, and application control. The functions are controlled from the firmware level. The functions may ensure a highly secure and controlled embedded system on the UAV in the event an application of the UAV is compromised by a third party. UEFI is used to provide a tamper proof way of enforcing permitted flights on authorized equipment.

15 Claims, 4 Drawing Sheets

(56) References Cited

U.S. PATENT DOCUMENTS

2019/0089545 A1    3/2019  Dias et al.
2021/0216639 A1*   7/2021  Hamlin .................. G06F 21/32

OTHER PUBLICATIONS

Anonymous: "Unified Exensible Firmware Interface-Wikipedia", Oct. 20, 2017.
European Search Report dated Feb. 14, 2024; European Application No. 23211588.1.
Rakesh Rajan Beck, et al. "Privaros: A Framework for Privacy-Compliant Delivery Drones", CCS '20, Nov. 9-13, 2020, Virtual Event USA.

* cited by examiner

DYNAMIC PRE-BOOT CONFIGURATION FOR FLIGHT SYSTEMS

CROSS-REFERENCE TO RELATED APPLICATIONS

The present application claims the benefit of India Provisional Patent Application 202311004396, filed Jan. 23, 2023, titled "DYNAMIC PRE-BOOT CONFIGURATION FOR FLIGHT SYSTEMS", naming Laveen Vikram Sundararaj et al. as inventors, with a Digital Access Service (DAS) code of AF70, which is incorporated herein by reference in the entirety.

TECHNICAL FIELD

The present invention generally relates to securely booting, and more specifically to securely booting unmanned aerial vehicles.

BACKGROUND

Aviation regulators mandate prior filing of permission before flights of unmanned aerial vehicles (UAV). For example, the Directorate General of Civil Aviation (DGCA) body of the Government of India has published regulations regarding No-Permission-No-Takeoff (NPNT). The permissions may include filing a flight path of the UAV, especially if the UAVs are above a certain class or weight restriction. Other countries and/or regulatory bodies may include similar permission requirements.

The technology behind seeking permission for the flight of the UAVs is enforced by applications that run over the operating system layer of the UAV. The security protocols implemented at the application level are vulnerable to data tampering. The applications may be subject to tweaking, spoofing, hacking by third parties. Therefore, it would be advantageous to provide a device, system, and method that mitigates the shortcomings described above.

SUMMARY

An unmanned aerial vehicle is described, in accordance with one or more embodiments of the present disclosure. In some embodiments, the unmanned aerial vehicle includes a memory maintaining program instructions. In some embodiments, the unmanned aerial vehicle includes one or more processors configured to execute the program instructions. In some embodiments, the program instructions cause the one or more processors to boot a Unified Extensible Firmware Interface (UEFI) shell. In some embodiments, the program instructions cause the one or more processors to download a permission file over a network while in the UEFI shell. In some embodiments, the permission file comprises one or more operational parameters for the unmanned aerial vehicle. In some embodiments, the program instructions cause the one or more processors to validate the permission file while in the UEFI shell. In some embodiments, the program instructions cause the one or more processors to boot an operating system in response to validating the permission file. In some embodiments, the UEFI shell is configured to pass the one or more operational parameters to the operating system. In some embodiments, the operating system is configured to pass the one or more operational parameters to the application, wherein the application controls a flight of the unmanned aerial vehicle within the one or more operational parameters.

An unmanned aircraft system is described in accordance with one or more embodiments of the present disclosure. In some embodiments, the unmanned aircraft system includes a server. In some embodiments, the unmanned aircraft system includes a control station. In some embodiments, the unmanned aircraft system includes an unmanned aerial vehicle. In some embodiments, the unmanned aerial vehicle includes a memory maintaining program instructions. In some embodiments, the unmanned aerial vehicle includes one or more processors configured to execute the program instructions. In some embodiments, the program instructions cause the one or more processors to boot a Unified Extensible Firmware Interface (UEFI) shell. In some embodiments, the program instructions cause the one or more processors to download a permission file from the server over a network while in the UEFI shell. In some embodiments, the permission file comprises one or more operational parameters for the unmanned aerial vehicle. In some embodiments, the program instructions cause the one or more processors to validate the permission file while in the UEFI shell. In some embodiments, the program instructions cause the one or more processors to boot an operating system in response to validating the permission file. In some embodiments, the UEFI shell is configured to pass the one or more operational parameters to the operating system. In some embodiments, the operating system is configured to pass one or more operational parameters to the application, wherein the application controls a flight of the unmanned aerial vehicle within the one or more operational parameters.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
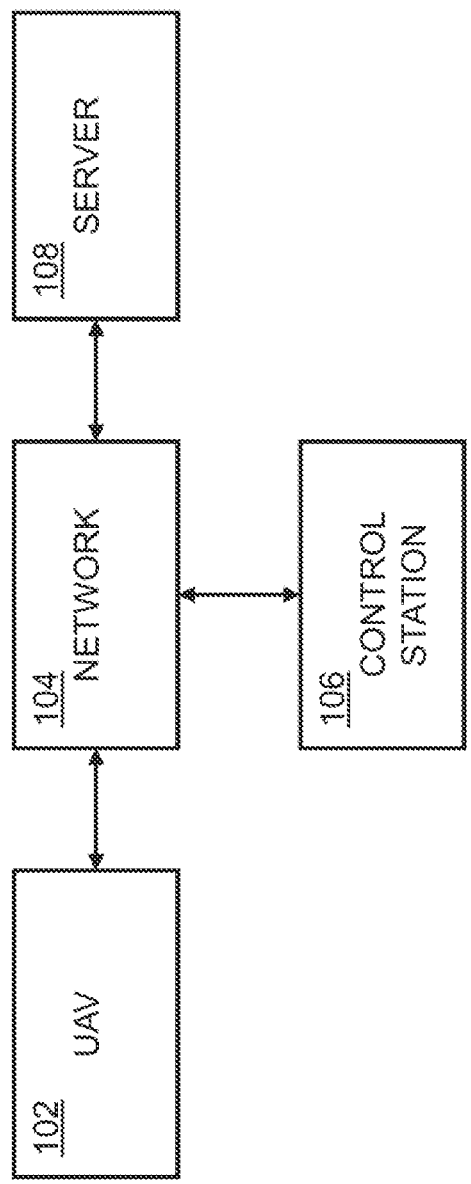
FIG. 1 depicts a block diagram of an unmanned aircraft system including an unmanned aerial vehicle, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. Embodiments of the present disclosure are directed to an unmanned aerial vehicle with a UEFI shell. The UEFI shell downloads a permission file from a server over a network. The UEFI shell validates the permission file using cryptographic primitives. The permission file is downloaded and validated before booting an operating system. The UEFI shell passes the permission file to the operating system for controlling various applications.

U.S. Pat. No. 11,345,473B1, titled "System and method for preventing inadvertent loss of surveillance coverage for an unmanned aircraft system (UAS)", filed on Dec. 5, 2019; and U.S. Pat. No. 11,157,288B2, titled "Securely and reliably transferring startup script", filed on Apr. 6, 2015; and U.S. Pat. No. 10,855,674B1, titled "Pre-boot network-based authentication", filed on Apr. 10, 2018; and U.S. Pat. No. 10,977,371B2, titled "Method and apparatus for secure device boot", filed on Jan. 4, 2019; are each incorporated herein by reference in their entirety.

Referring now to FIG. 1, an unmanned aircraft system 100, in accordance with one or more embodiments of the present disclosure. The unmanned aircraft system 100 may include one or more of an unmanned aerial vehicle (UAV) 102, a network 104, a control station 106, a server 108, and the like.

The UAV 102 may include a fixed-wing aircraft, a rotorcraft, jet-propelled vehicle (e.g., rocket), balloon, airship, and the like. Fixed-wing aircraft may refer to aircraft with wings which are fixed to a bulkhead or fuselage of the aircraft. Rotorcraft may refer to aircraft with wings or rotors mounted on a spinning shaft. In embodiments, the UAV 102 may include any unmanned aerial vehicle including, but not limited to, civilian drones, commercial drones, military drones, transport drones, and the like. The UAV 102 may also be referred to as a drone, an unmanned aircraft, and the like.

The control station 106 may be positioned remotely with respect to the UAV 102. The control station 106 may provide instructions to pilot the UAV 102. The unmanned aircraft system 100 may be referred to as a remotely piloted aircraft system (RPAS) when the UAV 102 is piloted by the control station 106. The control station 106 may be positioned within any ground control station, operation center, mobile control station, airborne control station, or the like.

In embodiments, the control station 106 may provide a command and control (C2) link to the UAV 102. The C2 link may generate one or more command and control (C2) signals configured to cause the UAV 102 to perform various tasks, functions, and/or prescribed flight plan maneuvers. The UAV 102 may receive the C2 signals and execute the various control commands. The control commands may cause the UAV 102 (e.g., via onboard processing) to execute one or more flight maneuvers. For example, the one or more flight maneuvers may include any flight maneuvers including, but not limited to, a change in altitude, a change in attitude (e.g., orientation with respect to one or more rotational axes), a change in heading, a change in position, follow a flight plan, a backtracking maneuver (e.g., backtracking along a flight path), a homing maneuver (e.g., returning to the control station 106), a hover-and-hold maneuver, a climb-and-hold maneuver, and the like. The control commands may also include a deploy payload command. The deploy payload command may cause the UAV 102 (e.g., via onboard processing) to deploy a payload. In embodiments, the UAV 102 may execute the various control commands on one or more computing systems by applications above an operating system layer.

Although the unmanned aircraft system 100 is described as including the control station 106, this is not intended as a limitation of the present disclosure. The control station 106 is provided solely for illustrative purposes, and is not to be regarded as a limitation of the present disclosure, unless noted otherwise herein. In embodiments, the UAV 102 may be an autonomous aircraft. In this regard, one or more functions of the control station 106 may be performed autonomously by the UAV 102.

In embodiments, the UAV 102 may download a permission file from the server 108. The UAV 102 may download the permission file from the server 108 over the network 104. The permission file may include approvals for specific Mission Devices and Operation for a given UAV. The permission file may be passed to a computing system of the UAV 102, as will be described further herein. In embodiments, an approved No-Permission-No-Takeoff (NPNT) is cast into the permission File.

The server 108 may include a processor and a memory. The server 108 may include a cloud-based architecture. For instance, it is contemplated herein that the server 108 may include a hosted server and/or cloud computing platform including, but not limited to, Amazon Web Services (e.g., Amazon EC2, and the like). In this regard, system 100 may include a software as a service (Saas) configuration, in which various functions or steps of the present disclosure are carried out by a remote server.

In embodiments, the UAV 102, the control station 106, and/or the server 108 may be communicatively coupled by the network 104 in any manner known in the art. For example, the UAV 102, the control station 106, and/or the server 108 may be directly coupled such that signals may be transmitted directly between the UAV 102, the control station 106, and/or the server 108. By way of another example, the UAV 102, the control station 106, and/or the server 108 may be communicatively coupled by an indirect coupling via the network 104. In embodiments, UAV 102, the control station 106, and/or the server 108 may each include network interface circuitry configured to interface with the network 104.

The network 104 may include any network known in the art. For example, the network 104 may include, but is not limited to, a network of terrestrial communication nodes (e.g., communication towers), a network of mobile communication nodes (e.g., mobile terrestrial communication nodes, mobile airborne communication nodes), and the like. It is further noted herein that the UAV 102, the control station 106, and/or the server 108 may be directly and/or indirectly (via network 104) communicatively coupled to one another via any communication protocols known in the art including, but not limited to, Link-16, Control and Non-Payload Communications (CNPC), GSM, GPRS, CDMA, EV-DO, EDGE, WiMAX, 3G, 4G, 4G LTE, 5G, WiFi protocols, radio frequency (RF), LoRa, and the like. For example, the UAV 102, the control station 106, and/or the server 108 may transmit data between each other, directly and/or via network 104, utilizing the L-band or C-band. By way of another example, the UAV 102, the control station 106, and/or the server 108 may utilize signals in the range of 450 MHz-5 GHZ, or any frequency or range of frequencies known in the art. The network 104 may also include any wireline communication protocol (e.g., DSL-based interconnection, cable-based interconnection, and the like). Interactions between the UAV 102, control station 106, and/or the server 108 may be determined based on one or more characteristics including, but not limited to, IP addresses, MAC addresses, and the like.

Figure 2:
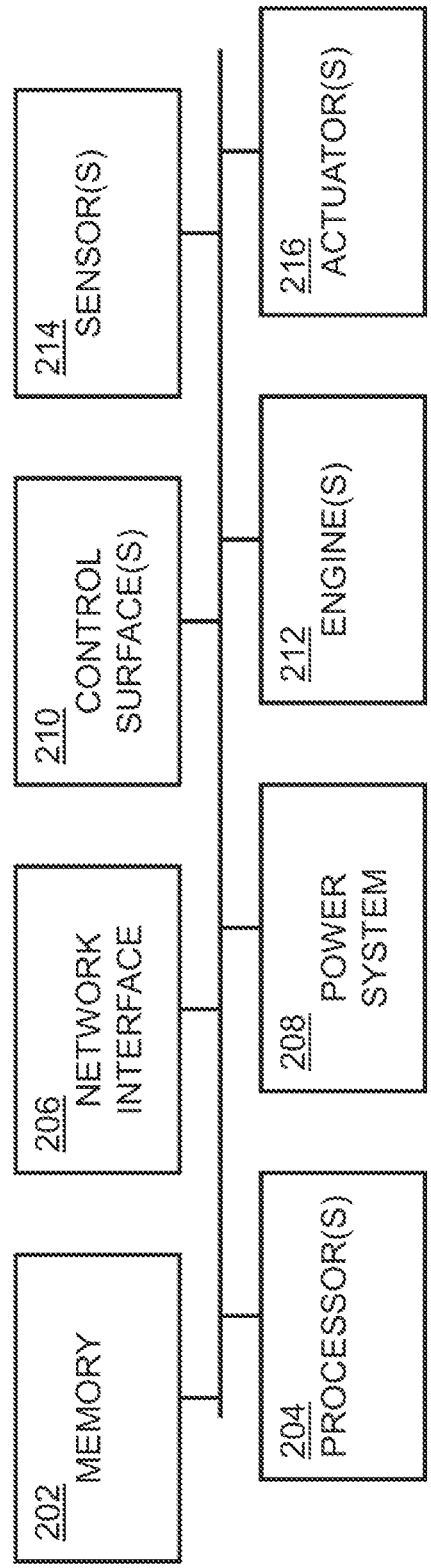
FIG. 2 depicts a block diagram of an unmanned aerial vehicle, in accordance with one or more embodiments of the present disclosure.

Referring now to FIG. 2, the UAV 102 is described, in accordance with one or more embodiments of the present disclosure. The UAV 102 may include one or more components, such as, but not limited to, a memory 202, one or more processors 204, a network interface 206, a power system 208, control surfaces 210, engines 212, sensors 214, actuators 216, and the like. One or more of components of the UAV 102 may be communicatively coupled by one or more control buses or the like.

The memory 202 may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, or the like. In an alternative embodiment, the memory may be located remotely with respect to the physical location of the processor. In another embodiment, the memory maintains program instructions for causing the processor(s) to carry out the various steps described through the present disclosure. The memory may include an operating system, program instructions, permission files, and the like, as will be described further herein.

The one or more processors 204 may include any processing unit known in the art. For example, the processors may include a multi-core processor, a single-core processor, a reconfigurable logic device (e.g., FPGAs), a digital signal processor (DSP), a special purpose logic device (e.g., ASICs), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors. For example, the processors 204 may be configured to receive control commands from the ground station 106, and perform one or more tasks, functions, or flight maneuvers in response to the received control commands.

The network interface 206 may include any suitable network interface for interfacing with the network 104, such as, but not limited to, a wired or a wireless network interface. The network interface may include mechanical, electrical, or signaling circuitry for communicating data to and from the network and subsequently to various other nodes. The UAV 102 may be configured to receive various input signals and transmit various output signals from the network interface 206. The network interface 206 may couple the UAV 102 to the network 104. The network interface 206 may wirelessly communicate with the network 104 (e.g., via one or more radio signals).

The UAV 102 may include a power system 208. The power system 208 may provide power to any of the various components of the UAV 102. The power system 208 may include any system suitable for providing the power, such as, but not limited to, an electrical power system.

In embodiments, the UAV 102 may include control surfaces 210 and/or engines 212. The control surfaces 210 and/or engines 212 may be adjusted to control the flight of the UAV 102 according to the control commands. The control surfaces 210 may include any control surface of a fixed-wing UAV. For example, control surfaces 210 may include, but are not limited to ailerons, elevators, rudders, spoilers, flaps, slats, air brakes, and the like.

In embodiments, the UAV 102 may include sensors 214. The sensors 214 may include any sensor, such as, but not limited to a GNSS sensor (e.g., GPS sensor), accelerometers, gyroscopes, magnetometers, barometers, inertial measurement units (IMUs), image sensors, and the like. The processors 204 may receive sensor data from the sensors 214. The processors 204 may control the control surfaces 210 and/or engines 212 using one or more control loops based on the sensor data.

In embodiments, the UAV 102 may include actuators 216. The actuators 216 may control and/or deploy a payload of the UAV 102. The payload may include any payload suitable to be carried by UAVs, such as, but not limited to, boxed packages, self-propelled payloads, and the like.

Figure 3:
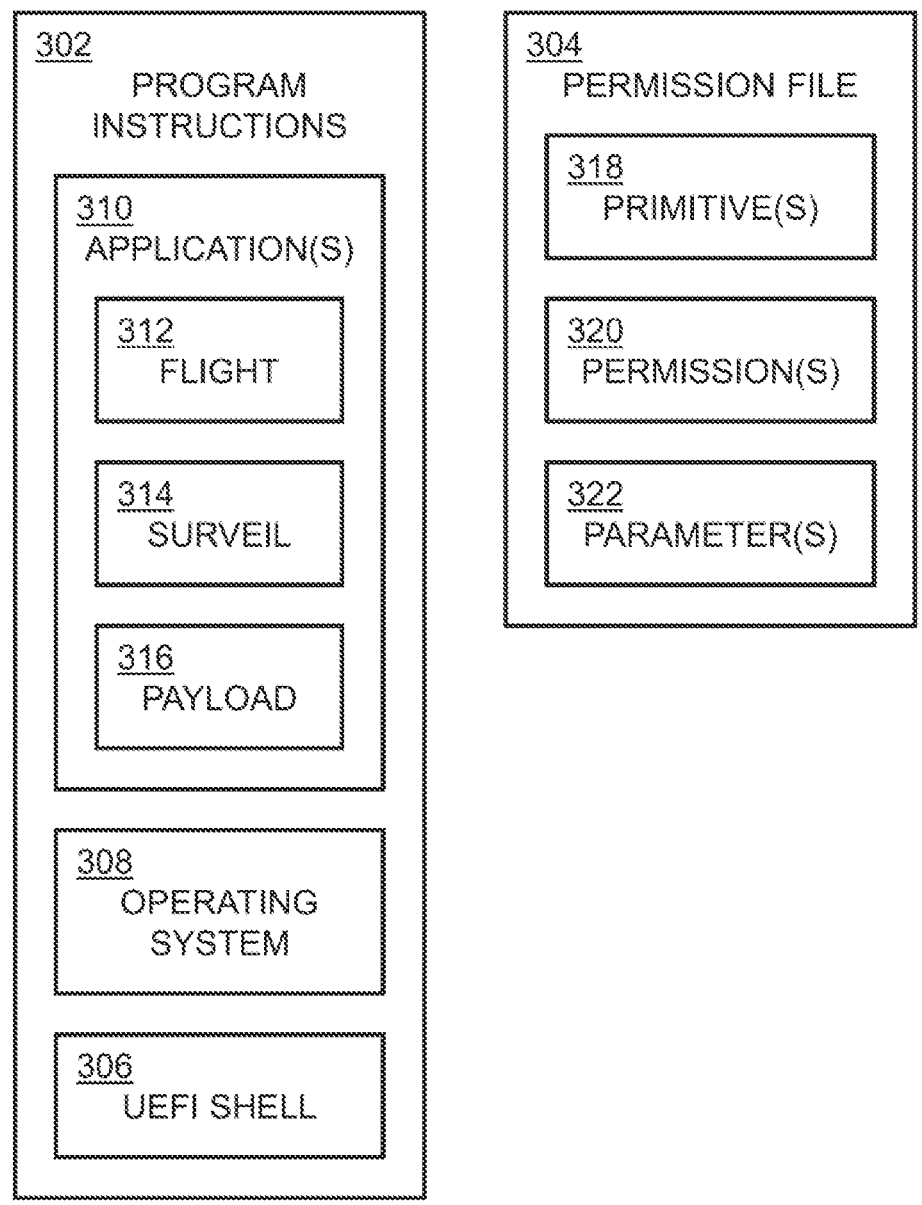
FIG. 3 depicts a block diagram of a memory of an unmanned aerial vehicle including a permission file, in accordance with one or more embodiments of the present disclosure.

Referring now to FIG. 3, the memory 202 is described, in accordance with one or more embodiments of the present disclosure. In embodiments, the memory 202 includes one or more of program instructions 302, permission files 304, and the like.

The program instructions 302 may include unified extensible firmware interface (UEFI) shell 306, an operating system 308, one or more applications 310, and the like.

The operating system 308 may control one or more of the applications 310. The applications 310 may include any software application of the UAV 102, such as, but not limited to, flight control applications 312, payload control applications 316, surveillance applications 314, and the like. The applications 310 may access one or more devices of the UAV 102, such as, but not limited to, cameras, flight systems, gyroscopes, actuators, sensors, lidar, RGB camera, heat-thermal camera, and the like. The applications 310 may require permission to access the devices.

The operating system 308 may control a flight of the UAV by the applications 310. The flight applications 312 may control the control surfaces 210 and/or the engines 212 of the UAV 102. The flight applications 312 may actuate the control surfaces 210 and/or the engines 212 to control a flight of the UAV 102. The flight applications 312 may control the flight of the UAV 102 within one or more operational parameters. For example, the operational parameters may include altitudes (e.g., maximum altitude, minimum altitude), position (e.g., latitude coordinates and longitude coordinates), speed (e.g., minimum speed, maximum speed), G-forces (e.g., maximum G-force), maneuvers, and the like. The flight applications 312 may require one or more permissions to control the control surfaces 210 and/or the engines 212. Without permission, the flight applications 312 are unable fly the UAV. Additionally, the permissions may limit or place boundaries on the operational parameters. For example, the permissions may prevent the UAV 102 from exercising maneuvers, exceeding G-forces, travelling outside geofenced positions, exceeding altitudes, and the like. For instance, the operating system 308 may control the flight of the UAV 102 below the maximum altitude, along the flight path, within the geofence, and the like.

The surveillance applications 314 may control one or more of the sensors 214 of the UAV 102. For example, the surveillance applications 314 may control image sensors of the UAV 102. The surveillance applications 314 may require one or more permissions to use the image sensor. Without permission, the surveillance applications 314 may be unable to command the image sensors to take photographs during flight.

The payload applications 316 may control one or more of the actuators 216 of the UAV 102. The payload applications 316 may actuate the actuators 216 to deploy a payload of the UAV 102. The payload applications 316 may require one or more permissions to use the actuators 216. Without permission, the payload applications 316 may be unable to command the actuators 216 to deploy the payload during flight. For example, the UAV 102 may be used as a delivery drone. The actuators 216 may be usable at a particular coordinate (lat/lon) to release package. The actuators 216 may be unusable at different coordinates.

The applications 310 of the UAV 102 may be subject to tweaking or spoofing by a third party. Security is a concern pertaining to the UAV 102. The UAV 102 may be subject to cyberattacks from the third parties.

In embodiments, the memory 202 may include the permission file 304. The permission file 304 may include one or more cryptographic primitives 318, permissions 320, operational parameters 322, and the like.

In embodiments, the permission file 304 may include the cryptographic primitives 318. The cryptographic primitives 318 may be used by the UAV 102 to verify the authenticity and/or integrity of the permission file 304. The cryptographic primitives 318 may include, but are not limited to, digital signatures, keys, checksums, message hashes, unique identifiers associated with the UAV 102, and the like. The unique identifier may include, but is not limited to, a tail number.

In embodiments, the permission file 304 may include the permissions 320. The permissions 320 may also be referred to as application permissions. The permissions 320 may provide permission to the applications 310 to access any of the various hardware or software of the UAV 102. For example, the permissions 320 may provide permission to the flight applications 312, the surveillance applications 314, and/or the payload applications 316 to access any of the memory 202, the processors 204, the network interface 206, the power system 208, the control surfaces 210, the engines 212, the sensors 214, the actuators 216, and the like. For instance, the permissions 320 may permit the surveillance application 314 to control the image sensor during flight, which the surveillance application would otherwise be prevented from without permission.

In embodiments, the permission file 304 may include the operational parameters 322. The operational parameters 322 may provide one or more limits on the applications 310. The operational parameters 322 may include parameters for the flight applications 312, the surveillance applications 314, the payload applications 316, and the like. The operating system 308 may control a flight of the UAV 102 within the operational parameters 322.

The permission file 304 may restrict the applications 310 to operate within certain boundaries. For example, the operational parameters 322 may include a range of altitude and/or geofencing (e.g., lat/lon coordinates). In this regard, the applications 310 may be used in a range of coordinates and/or the geofence and lose permissions outside of the geofence. For instance, the boundaries for the flight application 312, the surveillance application 314, and/or the payload application 316 may be set using operational parameters 322 of the permission file 304. For example, the geofence may indicate a position in which the payload application 316 is allowed or is not allowed to cause the actuators 216 to deploy the payload. The payload application 316 may then be prevented from causing the actuators 216 to deploy the payload within or outside of the geofence. By way of another example, the geofence may indicate a position in which the surveillance application 314 is allowed or is not allowed to cause the image sensors to capture images.

In embodiments, the operational parameters 322 may include one or more maneuvers for the flight applications 312. For example, the operational parameters 322 may allow the UAV 102 to perform a change in altitude, a change in attitude (e.g., orientation with respect to one or more rotational axes), a change in heading, a change in position, follow a flight plan, a backtracking maneuver (e.g., backtracking along a flight path), a homing maneuver (e.g., returning to the control station 106), a hover-and-hold maneuver, a climb-and-hold maneuver, and the like.

In embodiments, the operational parameters 322 may include one or more logical formulations. The logical formulations may prevent and/or allow certain combinations of parameters. For example, the operational parameters may independently allow following a flight plan and executing a maneuver. However, the logical formulation may prevent executing a maneuver at one or more locations in the flight plan.

In embodiments, the permissions 320 and the operational parameters 322 may be customized for the UAV 102. For example, the server 108 may customize the permissions 320 and the operational parameters 322 based on the unique identifier (e.g., tail number), a weight class, and/or a payload of the UAV 102. The permission file 304 may then provide flexibility to have different permissions 320 and the operational parameters 322 which is targeted to individual UAVs. The operational parameters 322 may also be customized based on mission requirements, legal regulations, and the like. In embodiments, the permission file 304 may be compliant with No-Permission-No-Takeoff (NPNT) regulations, although this is not intended to be limiting.

The program instructions 302 may cause the processors 204 to boot the Unified Extensible Firmware Interface (UEFI) shell 306. The UEFI shell 306 may also be referred to as a pre-boot configuration. The UEFI shell 306 may be configured according to one or more specifications. For example, the specifications may include the UEFI specifications set forth by the UEFI forum. The UEFI shell 306 may control one or more initialization processes of the UAV 102. In embodiments, the memory 202 may include firmware (not depicted). The program instructions 302 causing the processors 204 to boot the UEFI shell 306 may be maintained in firmware. The firmware may maintain one or more functions or program instructions of the memory 202. For example, the firmware may maintain the program instructions 302 to boot the UEFI shell 306. The firmware may include a non-volatile memory, but is not limited to, flash (e.g., NOR flash), ROM, EPROM, EEPROM, and the like. The operating system 308 and the applications 310 may be prevented from changing the permission file 304 by being maintained in the firmware.

The program instructions 302 may cause the processors 204 to download the permission file 304 within the UEFI shell 306. In this regard, downloading the permission file 304 is performed below the operating system 308 layers. The program instructions 302 may cause the processors 204 to download the permission file 304 from the server 108 over the network 104 by way of the network interface 206. In some instances, the network 104 may include a wireless or radio network. The UEFI shell 306 may or may not include logic for radio communications. The network interface 206 may include logic for radio communications over the network 104. The UEFI shell 306 may communicate with the network interface 206, causing the network interface 206 to download the permission file 304. For example, the UEFI shell may connect to the network interface 206 using the various internet protocols, transport layers, and application layers.

The UEFI shell 306 may also implement one or more security logics. The security logics may include authentication and/or integrity checking. For example, the UEFI shell 306 may validate or invalidate the permission file 304 by the cryptographic primitives 318. In this regard, the UEFI shell 306 may be configured to check whether the permission file has the integrity (checksum, hash check, etc.), check that the permission file 304 is coming from the server 108, and/or check that the permission file 304 is at the intended UAV destination (e.g., check the tail number). For example, if the checksum or hash matches the required text, the permission file 304 may be considered to include sufficient integrity. The UEFI shell 306 may validate the permission file 304 in response to downloading the permission file 304. The UEFI shell 306 may also read through the permission file and determine whether the combination of operational parameters 322 are valid. The combination of operational parameters 322 which are valid may be make and/or model specific and may vary between UAVs.

The UEFI shell 306 may perform one or more operations upon determining the permission file 304 is invalid. The UEFI shell 306 may stall booting the operating system 308 until the permission file 304 is validated. The stall in booting the operating system 308 may stop a passage of control to the operating system 308 and applications 310. The UEFI shell 306 may download additional copies of the permission file 304 over the network in response to determining the permission file 304 is invalid. The UEFI shell 306 may download the additional copies after a pre-determined wait interval. The UEFI shell 306 may then validate or invalidate the additional copies. The cycle may continue until the permission file is validated.

In embodiments, the program instructions 302 may cause the processors 204 to boot an operating system 308 in response to validating the permission file 304. The UEFI shell 306 may boot the operating system 308, cause a boot manager to boot the operating system 308, initiate an operating system kernel, check a boot flag, or the like. The UEFI shell 306 may pass control to the kernel and then further to the operating system 308. Once booted, the operating system 308 may control the applications 310.

The permission file 304 may be maintained in a memory space which is accessible by the UEFI shell 306 and the operating system 308. The permission file 304 may be downloaded to the common memory space. The operational parameters 322 may be passed from the UEFI shell 306 to the operating system 308. The operating system 308 may receive the operational parameters 322 for use by the applications 310 and pass the operational parameters to the applications 310. The operating system 308 may also receive the permissions 320 and provide the permissions 320 to the applications 310.

Thus, the operation of downloading and validating the permission file 304 may be performed within the UEFI shell 306 (e.g., at a firmware level). The permissions 320 and operational parameters 322 may be determined before the operating system 308 is booted or during pre-boot configuration. The permissions 320 and operational parameters 322 may be resistant to tampering and network attacks, as compared to an application-level security protocol. The server 108 may then be confident that the permissions 320 and operational parameters 322 are enforced by the UAVs 102. In this regard, the UEFI shell 306 may be advantageous to ensure compliance with NPNT regulations and the like.

In embodiments, the permission file 304 may be dynamic. The program instructions 302 may cause the processors 204 to update the permissions 320 and/or the operational parameters 322 during the flight of the UAV 102 from the UEFI shell 306. For example, the permissions 320 and/or the operational parameters 322 may be changed or renewed during flight. Changing the permissions 320 and operational parameters 322 may be performed by downloading a new permission file. The new permission file may be downloaded from the UEFI shell 306. The UEFI shell 306 may similarly perform the validation on the new permission file. The operating system 308 may maintain the permissions 320 and the operational parameters 322 from the initially validated permission file until the new permission file is validated. The operating system 308 may be updated with the new permissions and the new operational parameters. In this regard, the operating system 308 may be soft rebooted mid-flight. The soft reboot is advantageous to ensure continuous flight of the UAV 102.

In embodiments, the UEFI shell 306 is configured to filter internet protocol (IP) addresses. The IP address may be filtered according to a list of allowed IP addresses. The list of allowed IP addresses may also be referred to as whitelisted IP addresses. Only permission files from whitelisted IP addresses may be validated. The program instructions 302 may cause the processors 204 to restrict traffic from all IP addresses on the network 104 which are not in the list of allowed IP addresses. In embodiments, permission files from IP addresses not in the list of allowed IP addresses may be maintained in memory. The program instructions 302 may cause the processors 204 to store received traffic from IP addresses not in the list of allowed IP addresses in the memory 202 while in the UEFI shell 306. The IP filtering may be beneficial for diagnostics purposes and/or to detect attacks from malicious IP addresses.

Figure 4:
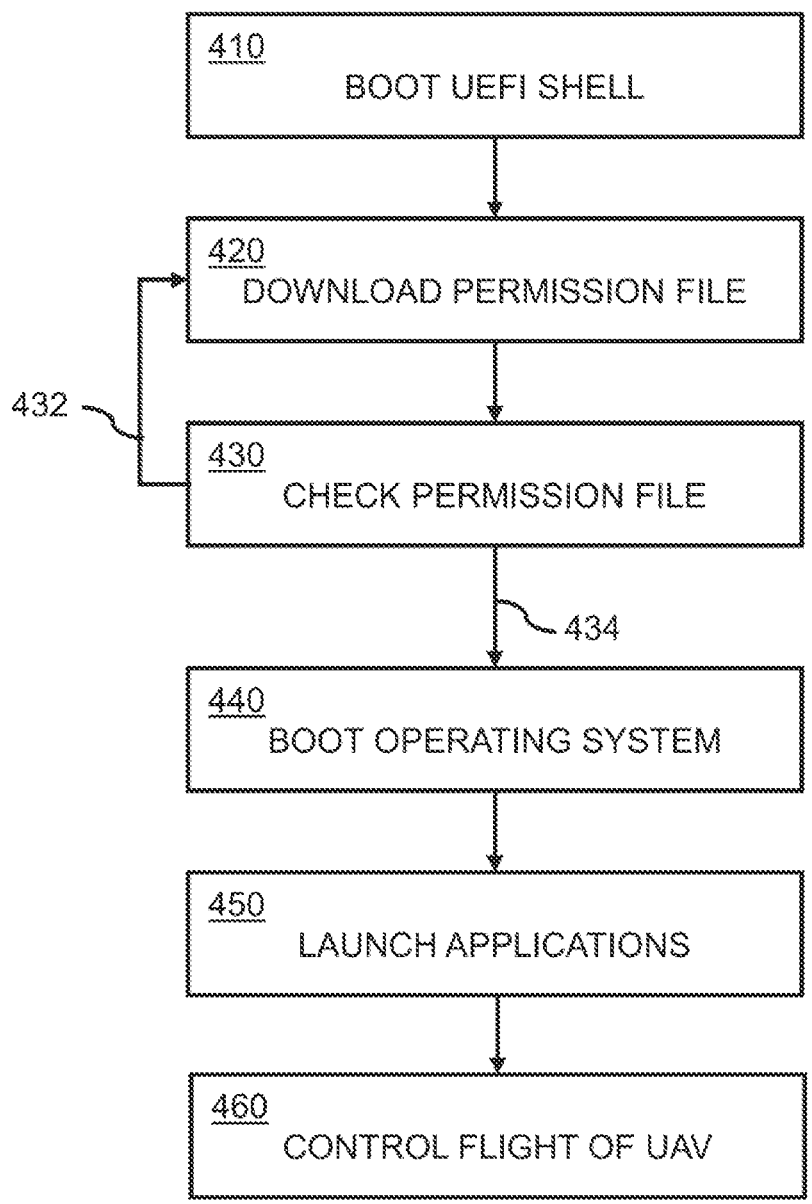
FIG. 4 depicts a flow diagram of a method of dynamic pre-boot configuration for a flight system, in accordance with one or more embodiments of the present disclosure.

Referring now to FIG. 4, a flow diagram of a method 400, in accordance with one or more embodiments of the present disclosure. The method 400 may enforce rules for flight systems and applications via a dynamic pre-boot. In particular, the dynamic pre-boot may be through firmware, using UEFI over a network.

In a step 410, a UEFI shell 306 is booted. The UEFI shell may be booted upon system start.

In a step 420, a permission file 304 is downloaded. The permission file may be downloaded while in the UEFI shell. The UEFI shell may include automated scripts that download the permission file over the network 104 (e.g., from the server 108). In this regard, the permission file is introduced at the firmware level only. For example, the UEFI shell may connect to IPV4, IPV6, and the like. The permission file may be downloaded using one or more transport layers such as, but not limited to, UDP, TCP, and the like. The permission file may be downloaded using one or more application layer protocols, such as, but not limited to, FTP, TFTP, HTTP, and the like. Downloading may refer to the UAV 102 receiving the permission file from the server 108 by way of the network 104. For example, the permission file may be sent to the UAV over a VHF radio signal, although this is not intended to be limiting.

In a step 430, the permission file is checked for validity. The permission file may be checked while in the UEFI shell. Checking the permission file for validity may refer to validating or invalidating the permission file. The permission file may be checked for required permissions. The permission file may also be compared against a cryptographic primitive 318, such as a checksum, for authenticity and/or integrity.

In a step 432, the permission file is invalidated while in the UEFI shell. One or more copies of the permission file may be downloaded from the network while in the UEFI shell in response to invalidating the permission file. A time period may be waited before downloading the one or more additional copies of the permission file. The time period may be pre-configured by one or more system settings. In this regard, the method 400 may include stalling in the UEFI shell by not booting the operating system until the permission file is validated. The method 400 may stall in the UEFI shell until the cryptographic primitives are validated. In this regard, the step 420, the step 430, and the step 432 may be repeated iteratively until the permission file is validated.

In a step 434, the permission file is validated while in the UEFI shell. When the permission file is validated, the boot flag is enabled and the operating system 308 is booted.

In a step 440, the operating system is booted. The operating system is booted in response to validating the permission file. The UEFI shell may pass the permissions and operational parameters to the operating system. The permission and operational parameters may be passed from the UEFI shell to the operating system by reading the contents of the permission file from memory. For example, the contents of the permission file may be read from a swap memory location where the permission file was downloaded. The swap memory location may be accessible by both the UEFI shell and the operating system. The operating system may provide permissions to the applications based on the operational parameters.

In a step 450, the operating system may launch the applications 310. The applications 310 may read the permissions provided by the operating system 308.

In a step 460, the flight of the UAV is controlled within one or more operational parameters 322 set by the permission file. The operating system may control the flight of the UAV within the operational parameters. For example, the operating system may limit one or more applications launch 450 based on the operational parameters. The step 460 may also include the operating system 308 providing the permissions 320 to the applications 310.

The method 400 may implement mandates from regulatory authorities to request permission before flight, such as DGCA's NPNT (No-Permission No-Takeoff) regulations. The step 420 and step 430 may be performed within the UEFI shell or at the firmware level. In this regard, the software applications cannot tamper with the permission levels or operational parameters.

Referring generally again to FIGS. 1-4.

Although much of the present disclosure is directed to UAVs, this is not intended as a limitation of the present disclosure. It is contemplated that the methods described herein may be applicable to a number of systems and hardware, such as, but not limited to, aircraft appliances, network drives, Automated Teller Machine systems, Cellular Telecom Systems, vending machines, Dispensing machines, Point-Of-Sale, Set-top-boxes, Smart Televisions, and the like. For example, the method 400 may be applied to enforce regulatory rule (temperature limits, etc.) or commercial rules (quantity dispensed) on aircraft appliances such as ovens, beverage heaters, and the like in aircraft galleys. By way of another example, the method 400 may be applied to enforce levels of authorization for like vending machines, Automated Teller Machines, Dispensing machines, Point-Of-Sale, Set-top-boxes, Smart Televisions, and the like. By way of another example, the method 400 may be applied to provide tamper proof authorization settings like parental controls, transaction limits, and the like.

The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An unmanned aerial vehicle comprising:
  a memory maintaining program instructions; and
  one or more processors configured to execute the program instructions causing the one or more processors to:
    boot a Unified Extensible Firmware Interface (UEFI) shell;
    download a permission file over a network while in the UEFI shell, wherein the permission file comprises operational parameters for the unmanned aerial vehicle;
    validate the permission file while in the UEFI shell;
    boot an operating system in response to validating the permission file, wherein the UEFI shell is configured to pass the operational parameters to the operating system, wherein the operating system is configured to pass the operational parameters to an application, wherein the application controls a flight of the unmanned aerial vehicle within the operational parameters.

2. The unmanned aerial vehicle of claim 1, wherein the program instructions cause the one or more processors to iteratively:
  invalidate the permission file while in the UEFI shell;
  download one or more copies of the permission file from the network while in the UEFI shell in response to invalidating the permission file; and
  stall in the UEFI shell by not booting the operating system until the permission file is validated.

3. The unmanned aerial vehicle of claim 1, wherein the program instructions cause the one or more processors to update the operational parameters during the flight of the unmanned aerial vehicle from the UEFI shell.

4. The unmanned aerial vehicle of claim 1, wherein the operational parameters comprise a maximum altitude for the unmanned aerial vehicle; wherein the application controls the flight of the unmanned aerial vehicle below the maximum altitude.

5. The unmanned aerial vehicle of claim 1, wherein the operational parameters comprise a flight path; wherein the application controls the flight of the unmanned aerial vehicle along the flight path.

6. The unmanned aerial vehicle of claim 1, wherein the operational parameters comprise a geofence for the unmanned aerial vehicle.

7. The unmanned aerial vehicle of claim 6, wherein the application maintains the flight of the unmanned aerial vehicle within the geofence.

8. The unmanned aerial vehicle of claim 6, comprising one or more actuators and a payload; wherein the one or more actuators are configured to deploy the payload; wherein the geofence indicates a position in which the application is allowed to cause the one or more actuators to deploy the payload; wherein the application is prevented from causing the one or more actuators to deploy the payload outside of the geofence.

9. The unmanned aerial vehicle of claim 1, wherein the permission file comprises one or more permissions for the application.

10. The unmanned aerial vehicle of claim 9, comprising an image sensor; wherein the one or more permissions permit the application to control the image sensor; wherein the one or more applications are prevented from controlling the image sensor without the one or more permissions.

11. The unmanned aerial vehicle of claim 1, wherein the memory comprises a list of allowed internet protocol (IP) addresses; wherein the program instructions cause the one or more processors to restrict traffic from all IP addresses on the network which are not in the list of allowed IP addresses; wherein the program instructions cause the one or more processors to store received traffic from IP addresses not in the list of allowed IP addresses in the memory while in the UEFI shell.

12. The unmanned aerial vehicle of claim 1, wherein the program instructions causing the one or more processors to boot the UEFI shell are maintained in firmware.

13. The unmanned aerial vehicle of claim 1, wherein the unmanned aerial vehicle is one of a fixed-wing aircraft, a rotorcraft, a rocket, a balloon, or an airship.

14. The unmanned aerial vehicle of claim 1, comprising a network interface configured to wirelessly communicate over the network; wherein the UEFI shell causes the network interface to download the permission file.

15. An unmanned aircraft system comprising:
  a server; and
  an unmanned aerial vehicle comprising:
    a memory maintaining program instructions; and
    one or more processors configured to execute the program instructions causing the one or more processors to:
      boot a Unified Extensible Firmware Interface (UEFI) shell;
      download a permission file from the server over a network while in the UEFI shell, wherein the permission file comprises operational parameters for the unmanned aerial vehicle;
      validate the permission file while in the UEFI shell;
      boot an operating system in response to validating the permission file, wherein the UEFI shell is configured to pass the operational parameters to the operating system, wherein the operating system is configured to pass the operational parameters to an application, wherein the application controls a flight of the unmanned aerial vehicle within the operational parameters.

* * * * *